C. C. NEALE & R. W. SMITH.
TARE WEIGHT COMPENSATOR FOR BEAM SCALES.
APPLICATION FILED JAN. 12, 1915.
1,222,787.
Patented Apr. 17, 1917.
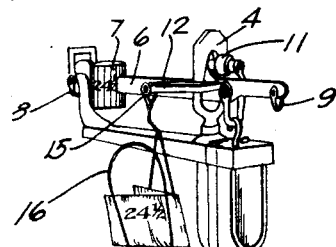
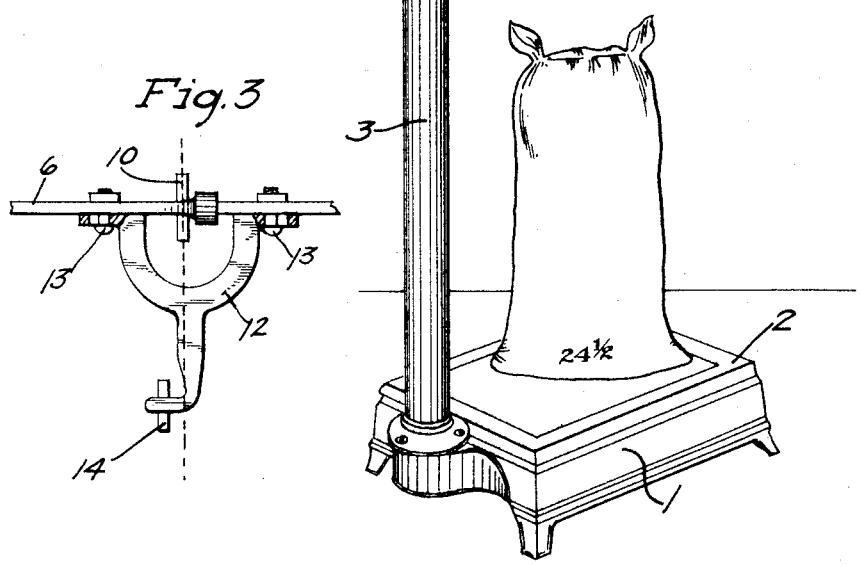
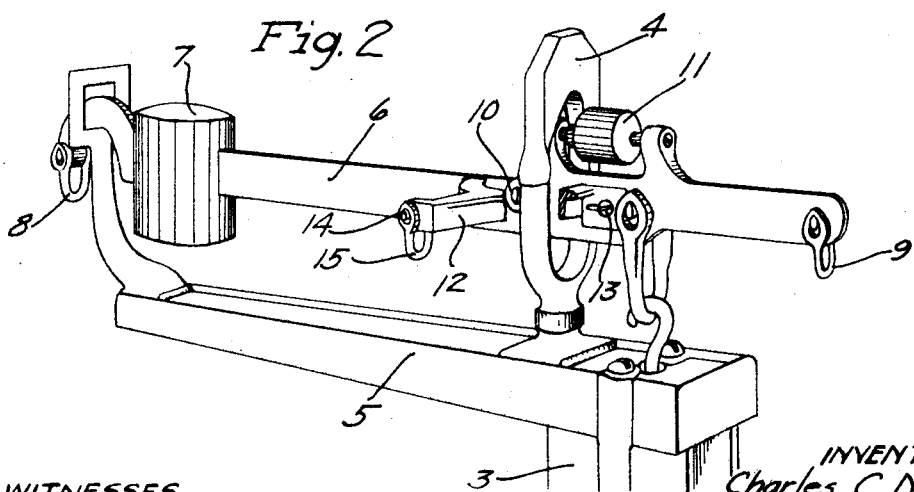
WITNESSES
E. C. Skinkle
A. H. Opsahl
INVENTORS
Charles C. Neale
Ralph W. Smith
BY THEIR ATTORNEYS
Williamson & Merchant

UNITED STATES PATENT OFFICE.

CHARLES C. NEALE, OF MINNEAPOLIS, AND RALPH W. SMITH, OF ST. PAUL, MINNESOTA.

TARE-WEIGHT COMPENSATOR FOR BEAM-SCALES.

1,222,787. Specification of Letters Patent. Patented Apr. 17, 1917.

Application filed January 12, 1915. Serial No. 1,753.

*To all whom it may concern:*

Be it known that we, CHARLES C. NEALE and RALPH W. SMITH, the said CHARLES C. NEALE residing at Minneapolis, in the county of Hennepin and State of Minnesota, and the said RALPH W. SMITH residing at St. Paul, in the county of Ramsey and State of Minnesota, have invented certain new and useful Improvements in Tare-Weight Compensators for Beam-Scales; and we do hereby declare the following to be a full, clear, and exact description of the invention, such as will enable others skilled in the art to which it appertains to make and use the same.

Our invention has for its object to provide an extremely simple and highly efficient tare weight compensator for beam scales, and to such ends, generally stated, the invention consists of the novel devices and combinations of devices hereinafter described and defined in the claims.

This improved tare weight compensator is capable of very general use wherever goods are packed in containers of uniform weight, but is especially adapted for use in flour mills, sugar refineries, seed houses, and houses that put up either in sacks or cartons, various breakfast foods and the like.

In the ordinary method of weighing flour, for example, the gross weight of sack and contents will be indicated on the scale, whereas, it is the net weight or weight of the contents of the sack or container that should be, and in fact, under the present food and drug act of June 30, 1906, as amended August 3rd, 1912, must be indicated on the sack.

In accordance with our invention, we apply a container support of some suitable form to the scale beam, at such point that a sack, bag, carton, or other container, or, in fact, any other article supported thereby from the scale beam, will exactly counterbalance a like article or weight applied on the platform or main load-support of the scale. The improved tare weight compensator is particularly adapted for use to what is known as a platform scale, but, nevertheless, it is capable of application to various other forms of scales; and it may be here stated that the term "load support" or "main load support" of the scale is used as a broad term to include all such devices as scale platforms, scale racks, scoops, and the like.

In the accompanying drawings which illustrate the invention, like characters indicate like parts throughout the several views.

Referring to the drawings:

Figure 1 is a perspective view showing a platform scale equipped with our improved tare weight compensator;

Fig. 2 is a perspective view with some parts broken away, showing the beam and shelf of the scale; and Fig. 3 is a detail view in plan showing the scale beam with the arm or bracket of the tare weight compensator applied thereto.

Of the parts of the platform scale, the numeral 1 indicates the frame, the numeral 2 the platform, the numeral 3 the pillar, the numeral 4 the fulcrum support, the numeral 5 the shelf, and the numeral 6 the beam of a platform scale, which may be of any suitable type, but which, as illustrated, is of a type known to the trade as "The Fairbanks bagging scale No. 1074 S. B." In this particular type of scale, the poise 7 is rigidly secured on the beam 6, and is of the proper weight to counterbalance twenty four and one half pounds on the scale platform 2. In this particular scale, to counterbalance forty-nine pounds on the platform 2, a bottle weight is hung from the tip loop 8 of the beam 6, while, on the other hand, to counterbalance twelve and one-fourth pounds on the scale platform 2, a bottle weight would be hung from the butt loop 9 of the said beam 6. It may be noted that the scale beam 6 has laterally projecting fulcrum pivots 10 that rest in loops of the fulcrum support 4. The said beam 6, it should also be noted, is provided with the customary balance ball 11.

As a very convenient and highly desirable way of applying our improved tare weight compensator to the scale, a horizontal arm 12 is secured to the beam 6 and projected laterally from one side thereof. This arm 12 may take various forms, but as shown, has a bifurcated inner portion that straddles one side of the fulcrum support 4 and is secured to the said beam by small bolts 13. To provide for a slight adjustment of the arm 12 longitudinally, the screws 13 are passed through elongated slots in the flanged inner ends of the arm 12. The outer end of the said arm 12 is provided with a pivot 14 on which a loop 15 is hung. Here it should be noted (see particularly Fig. 3) that the pivot 14, in a direction longitudinally of the beam 6, is offset slightly from the projected axis of the fulcrum pivot 10 of the beam 6. From the loop 15 is hung a container support shown as constructed from a single piece of wire 16 bent to a form suitable to hold a folded sack, bag, carton, or other container.

As already indicated in a general way, in the introductory part of this description, the compensator pivot 14 is offset in a direction longitudinally of the scale beam, or otherwise stated, is set forward of the fulcrum pivot 10 of the beam, such distance that any weight supported from the container support 16, will exactly counterbalance the same weight on the scale platform, or main load support of the scale. Otherwise stated, a "one to one" relation is established between the tare weight compensator and the platform of the main load support of the scale. It therefore follows that if when the flour is to be packed in twenty four and one-half pound sacks, one of the sacks is placed in the holder 16, the exact net weight of the flour in the sack on the scale beam will be indicated when a balance is indicated on the scale beam 6. This, of course, follows from the fact that the sack in the holder or container support of the tare weight compensator, exactly counterbalances the sack containing the flour on the platform. Of course, whenever the size or character of the sack or container on the platform is changed, the same change must be made in the empty container in the holder or support of the tare weight compensator. The tare weight compensator, however, requires no adjustment after it has once been properly set. This, of course, is because the weight in the tare weight compensator is made to exactly counterbalance a like weight on the scale platform or main load support of the scale.

It is also important to note that this tare weight compensator may be applied to the scale beam without making any change in the center of gravity or line of the beam. By proper adjustment of the balance ball 11, the proper balance of the beam is established, once for all, with the empty holder or container support 16 applied thereto, so that the scale may then be used in the ordinary way, when desired.

It is important that the bolts 13 work through slots in the seat of the arm 12, or that some other means be provided for permitting slight longitudinal adjustments of the said arm longitudinally of the scale beam. This adjustment affords means for giving the final and accurate adjustment of the arm 12 necessary to establish the exact counterbalance between like weights on the container support of the weight compensator and on the platform or main load support of the scale. It is desirable that the arm or bracket for supporting the tare weight compensator from the scale beam, be projected laterally and approximately horizontally therefrom, for several reasons. For instance, the said arm, when thus applied, does not change the center of gravity of the beam, does not change the line of pivots, and allows ample clearance beyond the scale shelf and pillar for a suspended container support or holder. Obviously, this tare weight compensator may be very easily and cheaply applied to the beams of scales already in use. Also, it makes unnecessary the continual setting of a balance poise in an effort to take care of the weight of the package or container being packed, or the use of loose ridders on the beam, or especially adjusted counter-weights, or working with the scale out of balance enough to take care of a predetermined value, all of which methods are based upon a system of averages that results in some packages being packed heavy and some light.

What we claim is:

1. The combination with a weighing scale having a beam and a main load support connected thereto, of a tare weight compensator comprising an arm secured to and projecting laterally from said beam and provided with a container support hung therefrom at a point forward of the beam fulcrum, such distance as to establish a "one to one" relation between said compensator and main load support, whereby equal weights supported on the holder of said compensator and on the main load support of said scale will counterbalance each other.

2. The combination with a weighing scale having a beam and a main load support connected thereto, of a tare weight compensator, comprising an arm rigidly secured to and projecting laterally from said beam and provided with a container support hung therefrom at a definite point forward of the beam fulcrum, the said arm having means permitting it to be adjusted longitudinally of said scale beam to effect the proper setting thereof.

In testimony whereof we affix our signatures in presence of two witnesses.

CHARLES C. NEALE.
RALPH W. SMITH.

Witnesses:
BERNICE G. WHEELER,
HARRY D. KILGORE.

Copies of this patent may be obtained for five cents each, by addressing the "Commissioner of Patents, Washington, D. C."